United States Patent [19]

Deaver et al.

[11] Patent Number: 4,654,656

[45] Date of Patent: Mar. 31, 1987

[54] OFF-LINE NOTIFICATION AND COMMUNICATION NETWORK

[75] Inventors: Randall L. Deaver; John L. Milligan, both of Longmont, Colo.

[73] Assignee: International Business Machines Corp., Armonk, N.Y.

[21] Appl. No.: 651,026

[22] Filed: Sep. 17, 1984

[51] Int. Cl.⁴ ............................ G05B 23/02; H04J 3/16
[52] U.S. Cl. ................................. 340/825.08; 370/90; 370/96
[58] Field of Search ...................... 340/825.08; 370/90, 370/96; 178/2 D

[56] References Cited

U.S. PATENT DOCUMENTS

| | | |
|---|---|---|
| 3,313,884 | 4/1967 | Hackenberg et al. . |
| 3,531,772 | 9/1970 | Dalyai et al. . |
| 4,112,467 | 9/1978 | Ogawa . |
| 4,136,333 | 1/1979 | Sumida et al. . |
| 4,251,865 | 2/1981 | Moore et al. ........................ 370/96 |
| 4,400,694 | 8/1983 | Wong et al. . |

FOREIGN PATENT DOCUMENTS

| | | | |
|---|---|---|---|
| 0012502 | 6/1980 | European Pat. Off. ........ | 340/825.08 |
| 0007652 | 1/1982 | Japan .................................... | 370/96 |

OTHER PUBLICATIONS

Franklin F. Kuo–editor, James P. Gray–author, "Synchronization in SNA Networks," *Protocol & Techniques for Data Communication Networks*, 1981, pp. 327–328.
Farr et al., "Dynamically Optimized Polling System," *IBM Technical Disclosure Bulletin*, vol. 20, No. 2, Jul. 1977, pp. 773–774.
Fredericksen et al., "Variable Multiplexing To and From Participating Systems," *IBM Technical Disclosure Bulletin*, vol. 13, No. 11, Apr. 1971, p. 3258.
Hayes, "Supervisory Response in Data–Processor–Controlled Printer", *IBM Technical Disclosure Bulletin*, vol. 25, No. 8, Jan. 1983, pp. 4220–4221.

Primary Examiner—John W. Caldwell, Sr.
Assistant Examiner—David W. Olson
Attorney, Agent, or Firm—Pollock, Vande Sande & Priddy

[57] ABSTRACT

The present invention relates to improvements in communication procedures, especially in networks which include at least one device which is capable of being manually switched to an off-line condition. In accordance with the invention, when a switch on such a device is thrown to the position which would place the device in an off-line condition, the device formulates and transmits a message to indicate that it is going to a temporary off-line condition. This message can be used at other devices which are connected in the communication network. Such a message can be employed at a network focal point for maintaining such a device in a polling loop regardless of the fact that the device may, for some period of time, fail to respond to any polls. Such a message can also be employed in any device which was in active communication with the device at the time it was placed in the temporary off-line condition to queue a restart request. In accordance with the invention, when the device which had been placed manually in an off-line condition, is again restored to the on-line condition, it will be in a condition to respond a poll from the network focal point. When it so responds to the poll, the network focal point is informed that the device is again capable of communicating, and any device which has a restart request pending for the device can enable the restart request.

13 Claims, 6 Drawing Figures

RECORD

| PN # | ACTIVE STATUS | TEMP OFFLINE | # OF POLLS |
|---|---|---|---|
| 1 | 0 | 1 | |
| 2 | 1 | 0 | 0 |
| 3 | 1 | 0 | 1 |
| 4 | 1 | 0 | 0 |

OFF-LINE NOTIFICATION AND COMMUNICATION NETWORK

DESCRIPTION

1. Technical Field The present invention relates to communication networks and more particularly to an improved apparatus and method for providing notification that a particular device is going off-line.

2. Background Art

Communication networks, providing inter-device communication, are being adapted to a wide variety of applications. As a natural result of both availability for communication among various devices and the additional applicability of these devices, the number of communication networks is growing at a rapid and increasing pace. There is a natural desire that the communication function be as invisible as possible, that is, it should take place with as little involvement by an operator as is possible.

Many of the devices which engage in such inter-device communication include a manual control (switch or button, etc.) that allows the user (or service personnel) to take the device off-line. Such an off-line condition is useful to load diagnostics, to disconnect communications or to print traces and error logs. In virtually all instances in which such a control is available, if it is operated during the course of communications, then communications are abnormally terminated. Even if such a control is operated at a time when no active communication is taking place, once the control is operated, communication with a device having such an operator control becomes impossible.

Such manual controls are provided so that communications cannot start up automatically when connected. This is for the reason that when such a control is operated, initiation or continuation of communication is undesirable for one or more reasons. Operation of such a manual control terminates (or prevents) communication in different manners. Some devices drop the data terminal ready (DTR) and leave it down so that a remote device cannot start up the particular device. Other devices just replace the communication code with diagnostic code so the device cannot have communication activated. There are still other techniques for terminating or preventing communication when such a manual control is operated. In any case, a particular device in which such a manual control has been operated appears to other elements in the network as off-line, that is, in an abnormal state.

Any remote device attempting to communicate with the particular device will be driven into an error state as a result of the abnormal condition of the particular device. Such a remote device may try to "poll" the particular device a specified number of times to determine if it is available or even present. If a response to the poll is received, then communications will be commenced or restarted. However, in case of such an off-line or manual control being in an operated or off-line state, no contact will be made. Thus, to the remainder of the network the particular device could be varied off-line and will be removed from any remote device's polling loop. This presents a problem when the particular device is ready to go back on-line.

Since the particular device has been removed from the polling loop, communications will not be restarted, or at least will not be automatically restarted. The operator of the remote device will have to be contacted (for example by a phone call, providing such an operator is available and can be reached) and informed that the particular device is now ready to communicate once again. This requires that the particular device must again be varied now on-line, and put back in the polling loop.

This presents real and substantial problems especially in devices wherein it is contemplated that such devices will necessarily be placed off-line. According to the present state of the prior art, this necessarily requires manual operator intervention to place the particular device back on-line again, and having to repeat this operation each time the particular device is varied off-line, can rapidly become tedious. In some instances, for diagnosing a fault, it may be necessary to repeatedly take a particular device off-line. If it is then necessary to manually engage in some procedure to put the particular device again back on-line, this requirement is an annoyance. Moreover, and especially if a remote device (such as a network control or the like) repeatedly polls all devices in the network to determine their status, then such a remote device may repeatedly determine that the particular device being placed off-line presents such a condition due to a communication problem. This may result in additional useless diagnoses whic again is an annoyance at the very least.

Accordingly, it is an object of the present invention to provide a method and apparatus for signifying to other devices in a network, that a particular device has been temporarily placed off-line. It is another object of the present invention to provide a method and apparatus for initiating procedures at other devices in the network in response to a particular device in the network having been placed off-line, which procedures are designed to prevent unnecessary operations at other devices and to allow the network pick up where it left off (if that is at all possible) when the particular device which had been manually placed off-line is now manually placed on-line.

There are at least two classes of nodes in which performance could be improved if they were provided with information that a particular device had been temporarily placed in an off-line condition, but that device may, in the future, be placed on-line again. In many networks, there is one or more devices which repeatedly polls other devices in the network to determine their status and availability. Such a device (for convenience termed a network control) maintains a record of the status of each other device for which it is responsible. The network control is typically provided with enough intelligence so that it does not repeatedly attempt to poll devices which are not available. This intelligence typically reacts after a number of unsuccessful polls has taken place, and in that event changes the status of the device that does not respond to the poll so that no further polling for that device will be initiated. For devices of this class it would be advisable to provide them with additional intelligence to allow remote devices to be categorized as either active, temporarily off-line, or unavailable. Intelligence would be provided to continue polling devices which are classified as temporarily off-line, so that when the devices become on-line again, communications can be resumed without unnecessary manual operations. Such intelligence may be allowed, however, to reduce the poll rate for devices which are indicated as temporarily off-line so as to minimize loss in efficiency.

Another class of devices whose operation could be improved by being informed of the temporarily off-line status of a particular device, is any device which is in active communication with such a particular device when it goes to the temporary off-line condition. With this knowledge, the remote device can queue an activation (restart) request.

When the particular device is restored to an on-line condition the queued activation request causes communication to begin automatically.

SUMMARY OF THE INVENTION

To meet these and other objects, the invention provides a method of controlling a communication network in the event a particular node is to be temporarily off-line, the method including the steps of providing a manually operable switch at a particular node for putting the particular node in a temporary off-line state in response to operation of the switch, and, in response to operating the switch formulating and transmitting message to another node in the network indicating that the particular node is going to a temporary off-line state and only thereafter putting the particular node into the off-line state. Another node in the network can, in response to receipt of the message received from the particular node, alter the poll rate for that particular node after the particular node fails to respond to a poll and this remote node can continue to poll the particular node at the altered poll rate notwithstanding the failure of the particular node to respond to any poll.

In the event the remote node happens to be a node with which the particular node was in active communication at the time the switch was operated, then on receipt of the message the remote node can queue a communication request and suspend that request until the particular node goes on-line again.

In another aspect the invention provides, for a network including a network control, at least two other nodes, and a link interconnecting the nodes and the network control, the network control including a record of all active nodes, and a polling device for communicating with all active nodes, the network control further including a delete device for removing a node from the record in the event the node does not respond to a poll within a time-out period, the invention comprises a method of controlling such a network in the event a node is to be temporarily off-line, the method including the steps of informing the network control that a particular node will be temporarily off-line and thereafter inhibiting operation of the delete device at the network control in response to failure of the particular node to thereafter respond to a poll. Once such a message has been received at the network control and the particular node has failed to respond to a poll, the polling device is controlled to poll that particular node at a relatively slow rate until it again responds to a poll, e.g. until it is again in an on-line state.

BRIEF DESCRIPTION OF THE DRAWINGS

The invention will now be further described in the following portions of the specification when taken in conjunction with the attached drawings in which like reference characters identify identifical apparatus and in which.

DETAILED DESCRIPTION OF THE INVENTION

Figure 1:
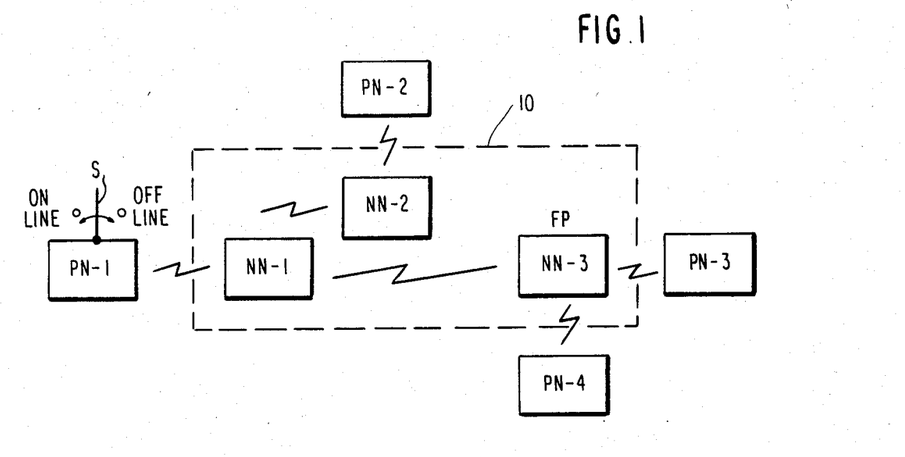
FIG. 1 schematically illustrates a typical network in which the invention can be applied.

FIG. 1 shows a typical network 10 used for interconnecting a plurality of devices identified as PN-1 (peripheral node) through PN-4. FIG. 1 also shows that a network 10 comprises a plurality of network nodes (NN-1 through NN-3) which are themselves interconnected so as to enable a communication path among the various peripheral nodes. The various peripheral nodes may be included within or associated with devices that use the communication capabilities of the network and its associated nodes to perform one or more tasks. For example, the peripheral nodes may be associated with computers, computer peripheral equipment such as video display terminals, printers, disk drives or the like, and in addition the terminals may be application specific, e.g. a supermark checkout counter, bank teller terminal, etc. The particular technology which is used to effect communication (both between the peripheral nodes and the network, and within the network) is immaterial to the invention, wired communications (base band or wide band), fiber optics, radio communications, etc. may be employed.

Typically, one of the network nodes is identified as the focal point (FP). FIG. 1 indicates that NN-3 is the FP (also referred to as the system services control point -SSCP). For purposes of describing a particular application of the invention we will assume that PN-1 is a printer, that PN-2 includes or is associated with information which a user desired to be printed on the printer associated with PN-1 and this function is accomplished in part through the services provided by the network 10. The printer associated with PN-1 includes a manually operable switch (push button or the like) which is designed for removing a PN-1 from the network, e.g. changing the status from active or on-line to off-line. As this description proceeds it will be apparent to those skilled in the art that the invention is not limited to use with printers, nor is it limited to networks which include only a single FP, and in fact can be used in networks with multiple FP's. To describe a particular application of the inventive method, assume that a particular node, PN-1, is a printer, which is in active communication with the node PN-2 and thus printing information transmitted to the particular node by the node PN-2. The network 10 has a focal point located at NN-3. Assume that at some point during this communication process there is a need manifested at PN-1 to take the printer off-line, that is to change its condition from on-line to off-line. This is accomplished at the printer PN-1 by manipulating the manually operable switch S from the on-line position to the off-line position. In the typical communication network in accordance with the prior art, this action would remove the node PN-1 from a communication process and therefore terminate the printing operation by the associated printer. The fact that node PN-1 is no longer communicating would be reflected at the nodes PN-2 and NN-3, the former because it was in active communication with the node PN-1, and the latter because of the status of this node as the focal point of the network. While both nodes PN-2 and NN-3 would be aware that PN-1 was now off-line, neither would be aware of the reason for this condition. The off-line appearance of PN-1 could be due to a failure of the communication network 10, a failure in the node PN-1 or its associated equipment, or because the node has been purposely put to an off-line condition. As a consequence a network operator (at NN-3) might be prompted to attempt to determine the reason for the off-line condition of PN-1, and similarly a user at PN-2 might also be tempted to determine the reason for the off-line condition of PN-1.

At some later time when the switch S is again manually operated from the off-line position to the on-line position, the node PN-1 would again be available for on-line operation. However, the on-line status of PN-1 would not automatically be reflected at the nodes PN-2 or NN-3. Rather, and as is typical with today's networks, a user at PN-1 would have to notify users at PN-2 and NN-3 that PN-1 was again on-line. It is this latter operation which is obviated in accordance with the invention.

Thus, in accordance with the invention when the switch S is moved to the off-line position, the particular node (PN-1) notifies its active session partner (PN-2) and the network focal point (NN-3) that the particular node is going to a temporary off-line condition. This will produce the following at each of these remote nodes. PN-2 will queue an activation (restart) request. When PN-1 is restored to the on-line condition, this queued activation request causes communication between PN-1 and PN-2 to begin again, and this operation occurs solely in response to the change in condition of PN-1. When communication begins again, PN-2 can now send data to PN-1 for further printing.

The messages formulated and transmitted in response the off-line condition of PN-1 also produce results at the focal point (NN-3). More particularly, the focal point of the network will typically maintain a record of the status of the various nodes in the network. For those nodes which are on-line, the record maintained at the focal point will reflect this status. The focal point maintains this record by periodically polling each of the devices which had previously been considered on-line. Failure of a specific device to respond to a poll, or a given number of polls may result in a change in the record indicating that the device is no longer on-line. Devices not considered on-line are not polled.

In accordance with the invention, the focal point (NN-3) maintains the identical record. However, the record provides for an additional status in addition to on-line, and that status is temporarily off-line. Devices whose status is temporarily off-line will not be removed from the polling loop because of a mere failure to respond to any number of polls. In order to maintain efficiency, the polling rate for devices which are temporarily off-line may be reduced from the rate at which on-line devices are polled.

Figure 3:
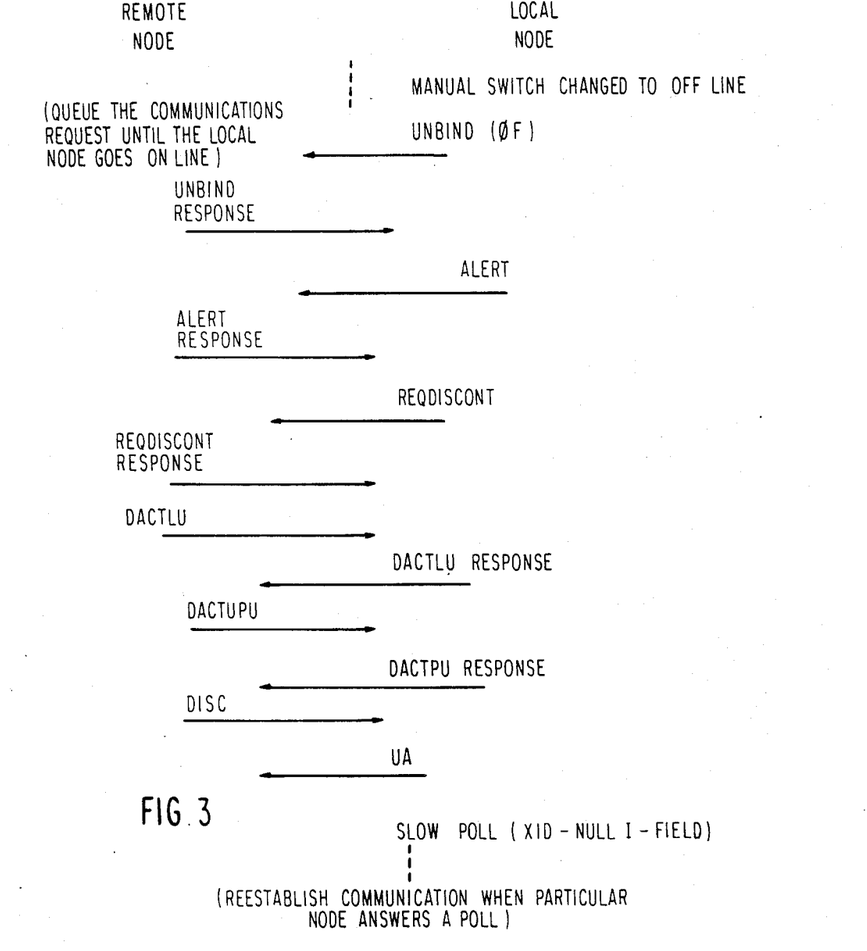
FIG. 3 illustrates the communication, e.g. message flow, between a remote node and a particular node which is to be put into a temporarily off-line state.

In order to effect this, the message transmitted by PN-1 when it goes to temporary off-line condition is used to change the status of PN-1 in the record maintained at the focal point, from on-line to temporarily off-line. This status maintains PN-1 in the polling loop regardless of the fact that it will fail to respond to any number of polls. In one particular implementation of the invention, the series of actions and reactions generated by the transition of the switch S to the off-line state is indicated in FIG. 3. As shown in FIG. 3, when the switch transition is detected at PN-1, a message is formulated and transmitted to the network (particularly to NN-1) as indicated in FIG. 3, e.g. UNBIND (0F). When NN-1 receives this message, it is transmitted onto the active session partner of PN-1, e.g. PN-2. This is the means by which the active session partner, PN-2 is informed that PN-1 is going temporarily off-line. Receipt of this message at PN-2 resets the communication status and gueues up a session activation command in anticipation of going back on-line at a later time. Thus, if a later time PN-2 is informed that PN-1 is now on-line, the queued session activation request will automatically result in communications being re-established. FIG. 3 indicates that a message is transmitted from NN-1 to PN-1 acknowledging the previous message. Of course, this acknowledgement comes from PN-2 via the network 10.

As shown in FIG. 3, PN-1 also generates an alert message which is coupled to its associated remote node NN-1. This message is transmitted onto the focal point to indicate that PN-1 is going off-line. An acknowledgement of the alert message is then generated and provided to PN-1. The next message shown in FIG. 3 is the REQDISCONT. This message also is destined for the focal point and is used by the focal point to deactivate the sessions with which PN-1 is engaged (this will become clear hereinafter). After responding to the REQDISCONT command, the focal point transmits the DACTLU and DACTPU. These are the focal point commands of deactivating the sessions, one a logical session with the focal point and the other the physical session with the focal point. The DACTLU is also communicated to PN-2. FIG. 3 shows that PN-1 has acknowledged the DACTLU and the DACTPU. Once those acknowledgements have been received, the link is deactivated via the DISC command. The messages shown in FIG. 3 terminate with the UA response (unnumbered acknowledgement) from the local node PN-1.

FIG. 3 indicates that thereafter the focal point reverts to a slow poll mode for polling the local node PN-1.

As shown be apparent to those skilled in the art, FIG. 3 is merely one implementation of the invention in accordance with SNA protocols, other and different implementations of the invention in SNA and other protocols will be apparent to those skilled in the art.

Figure 2:
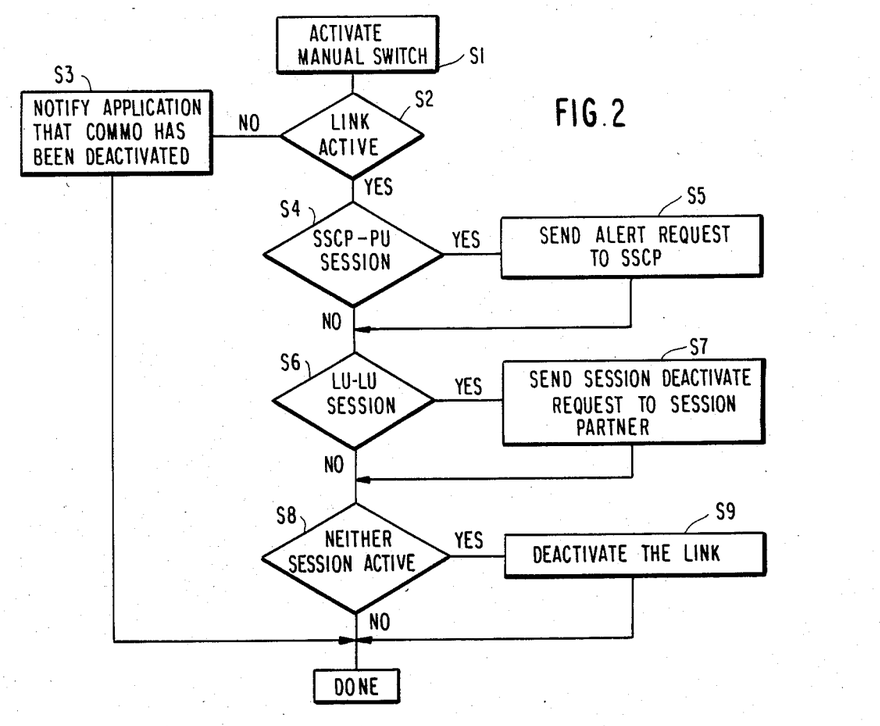
FIG. 2 is a flow chart of the functions carried out at a particular node which is to be put in a temporary off-line state.

FIG. 2 is a flow chart illustrating the steps carried out by the software at PN-1 in response to the condition of the switch S changing from the on-line to the off-line state. Step S1 is actually the switch transition. Step S2 determines if the link (between PN-1 and the network) is active. If the link is not active, then step S3 is performed to notify the application that communications has been deactivated. The application referred to in step 3 is the application resident at PN-1. After the completion of steps S1-S3, processing is terminated. Step S3 relates to the situation in which PN-1 is not actively part of the network, and thus use of the invention is unnecessary. On the other hand, assuming that the link was active, then step S3 would not be performed, rather step S4 would be performed to determine if the SSCP-PU session was active. If that was the case then step S5 prepares to send an alert request to the focal point. After step S5 has been performed, or if it was not necessary, step S6 determines if there is an LU—LU session which is active. If there is one, then step S7 is necessary to send a session deactivate request to the session partner (PN-2). If step S8 (following S6 or S7) is performed to determine whether neither session is active, and of course at the conclusion of step S6 or S7 that would be the case. If that is the case, then step S9 prepares to deactivate the link.

Figure 4A:
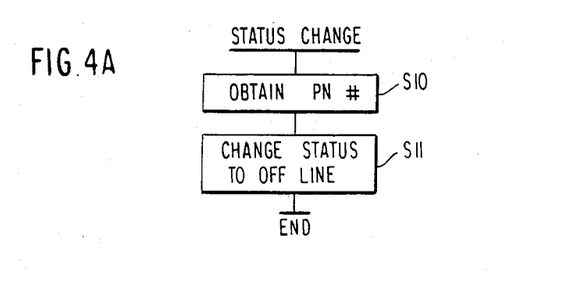
FIGS. 4A and 4B are a flow chart of steps performed at the network focal point.
Figure 4B:
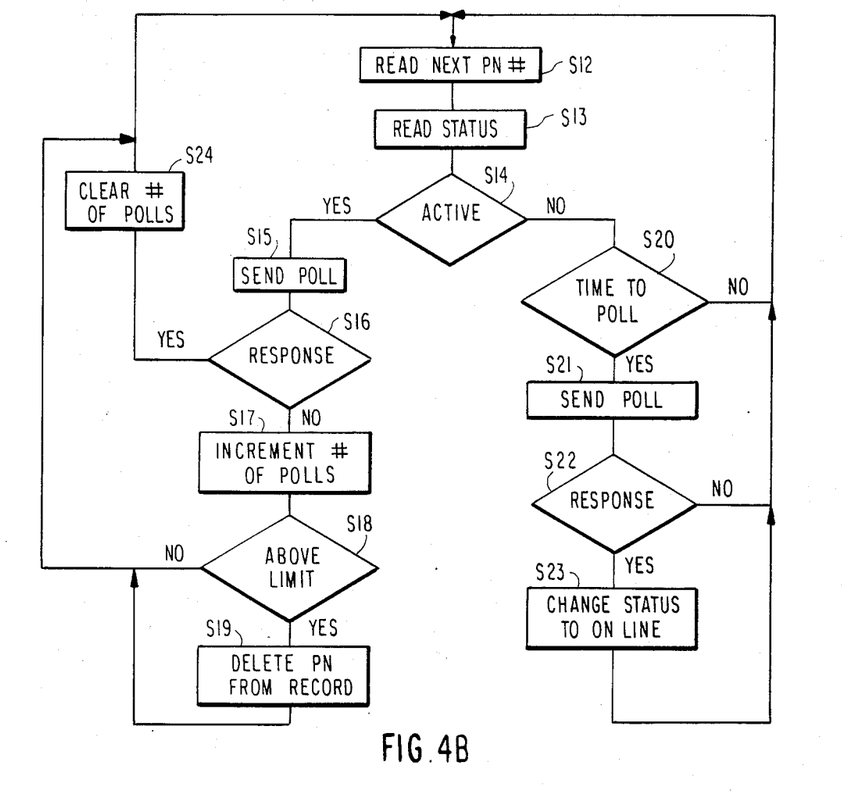
Figure 4C:
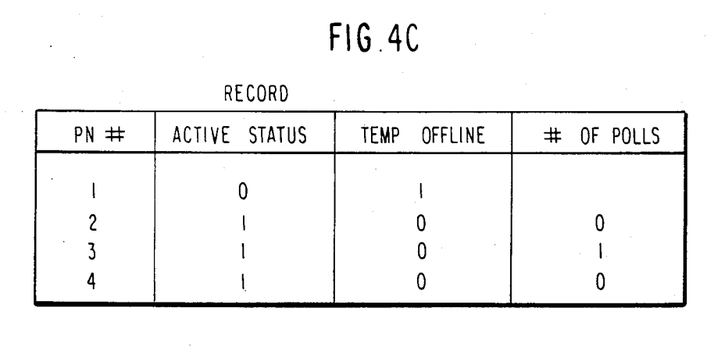
FIG. 4C is a diagram of a record of network status maintained at the focal point.

FIGS. 4A and 4B illustrate operations performed at the focal point in connection with the invention, whereas FIG. 4C illustrates a copy of the record maintained at the focal point of the status of various peripheral nodes. Referring to FIG. 4A, note that when a status change is detected at the focal point, e.g. an alter message, two steps are performed. Step S10 obtains the identification of the particular peripheral node from which the alert message was received. Step S11 uses that identification as an address into the record (to be described below) and changes the status of the identified peripheral node from an active status to a temporary off-line status. A typical example of such a record is shown in FIG. 4C, where there is a single entry for each peripheral node. Each entry indicates whether the status of that node is active or temporarily off-line. For convenience, the record also indicates the number of polls transmitted to the peripheral node which have not been responded to. It should be apparent to those skilled in the art that the information maintained in the record can be maintained in a number of forms, and FIG. 4C is but one example.

FIG. 3B shows the operations performed at the focal point related to polling of the various stations. As shown in FIG. 3B this operation is an endless loop. Beginning at step S12, the next peripheral node identification is read from the record. Step S13 reads the status of that peripheral node from the record. Step S14 is a branch depending upon that status. If the status is active then step S15 is performed to send a poll. Parenthetically, it should be noted that it is not necessary to send a poll each iteration through the loop, and if desired a poll could be sent on every third iteration, etc. Step S16 determines if there was a response to the poll. If there was, step S24 clears the number of polls in the record to which the node has not responded and that terminates this iteration of the loop for that particular node. The next step then is step S12 which is performed with respect to the next node identified in the record.

On the other hand, if there was no response from the node, then step S17 increments the number of polls (to which the node has not responded) maintained in the record for that node. Step S18 determines whether the number of polls is above some predetermined limit. If it is not, then the loop has been completed for this iteration and step S12 is again performed. If the number of polls is above the limit then step S19 deletes the peripheral node from the record and this step terminates the iteration of the loop.

Steps S12-S19 are typical of the operations performed by a prior art network focal point. It will be apparent, that in the absence of the invention, switching a node to a temporary off-line condition would, after some number of polls, remove that node from the record. As a consequence, no further communication attempts with the node would be attempted and it would be necessary to re-enter that node in the record via some manual operation.

However, in accordance with the invention, when step S14 is performed and it is determined that the status of the node is not active, then steps S20-S23 are available. Step S20 determines if it is time to poll. Assuming that the polling rate is one poll per iteration, and temporarily off-line nodes are polled at a slower rate (for example 1/10th of the normal rate) then every 10th time step S20 is performed with respect to a particular node, it would be time to poll. Otherwise, this particular iteration would be completed. If it were time to poll then step S21 sends a poll and step S22 checks for a response. In the absence of a response, this iteration is complete. However, if a response is detected from a node which is in a temporary off-line condition, then step S23 is performed to change that status to on-line.

The change is status of a node from temporary off-line to on-line, could be used by the focal point to signal all other nodes in the network that a particular node (PN-1, for example) is now on-line again. This would be significant at a node such as PN-2 which had queued a restart request for the particular node. Receipt of such a signal at node PN-2 would then automatically restart communications.

We claim:

1. A method of controlling a communication network in the event a node is to be temporarily off-line, said communication network including;

a network control, at least two nodes and a link interconnecting said nodes and said network control, said network control including a record of all active nodes, a polling device for communicating with all active nodes over said link and a delete device for removing a node from said record in the event said node does not respond to a poll within a time-out period, said method comprising the steps of:

(a) informing said network control that a particular node will be temporarily off-line.

(b) thereafter, inhibiting operation of said delete device at said network control in response to failure of said particular node to thereafter respond to a poll.

2. The method of claim 1 which includes the further step of:

(c) controlling said polling device to poll said particular node at a relatively slow rate until it responds to a poll, and for thereafter disabling said inhibiting step.

3. The method of claim 2 which includes the further step of:

(d) informing an active session partner of said particular node that said particular node will be temporarily off-line.

4. The method of claim 3 which includes the further step of:

(e) reestablishing communication between said particular node and said session partner in response to said particular node answering said poll.

5. The method of claim 1 which includes the further step of:

(c) reducing the poll rate for said particular node after said particular node fails to respond to a poll within said time-out period.

6. The method of claim controlling a communication network in, the event a node is to be temporarily off-line comprising the steps of:

(a) informing a network control that a particular node will be temporarily off-line, (b) informing an active session partner of said particular node that said particular node will be temporarily off-line, (c) inhibiting an error condition at said network control in response to failure of said particular node to thereafter respond to a poll.

7. The method of claim 6 which includes the further step of:
(d) altering a poll rate for said particular node after said particular node fails to respond to a poll.

8. The method of claim 7 which includes the further step of:
(e) terminating said inhibition of step c and restoring an original poll rate for said particular node after said particular node again responds to a poll.

9. The method of claim 8 which includes the further step of restoring communication between said particular node and said sesson partner after said particular node again responds to a poll.

10. A method of controlling a communication network in the event a particular node is to be temporarily off-line in which said network includes another node representing a network control which polls all nodes of said network comprising the steps of,
providing a manually operable switch at said particular node for putting said particular node in a temporary offline state in response to operation of said switch,
formulating and transmitting a message to said another node in said network in response to operation of said switch indicating that said particular node is going to temporary off-line state,
thereafter putting said particular node in an off-line state,
altering a poll rate for said particular node after said particular node fails to respond to a poll from said network control, and
continuing to poll said particular node at said altered poll rate notwithstanding the failure of said particular node to respond to any poll.

11. The method of claim 10 in which said network includes a further node with which said particular node is communicating and in which said method includes the further steps of:
queuing a communication request at said another node for communication with said particular node, and
suspending said request until said particular node goes on-line.

12. A method of controlling a communication network in the event a particular node is to be temporarily off-line, in which said network includes another node involved in active communication with said particular node, comprising the steps of:
providing a manually operable switch at said particular node for putting said particular node in a temporary off-line state in response to operation of said switch,
formulating and transmitting a message to said another node in said network in response to operation of said switch indicating that said particular node is going to a temporary off-line state,
thereafter putting said particular node in an off-line state,
queuing a communication request at said another node for communication with said particular node, and
suspending said request until said particular node goes on-line.

13. The method of claim 12 in which said network further includes a network control node and which said method includes the further steps of:
formulating and transmitting another message to said network control node in response to operation of said switch indicating said particular node is going to a temporary off-line state,
altering a poll rate for said particular node after said particular node fails to respond to a poll from said network control, and
continuing to poll said particular node at said altered poll rate notwithstanding the failure of said particular node to respond to any poll.

* * * * *

UNITED STATES PATENT AND TRADEMARK OFFICE
CERTIFICATE OF CORRECTION

PATENT NO. : 4,654,656

DATED : March 31, 1987

INVENTOR(S) : Deaver et al

It is certified that error appears in the above—identified patent and that said Letters Patent is hereby corrected as shown below:

Abstract, line 21, after "respond" insert --to--.

Col. 3, line 2, change "temporarily" to --temporary--.

Col. 3, line 21, after "transmitting" insert --a--.

Col. 3, line 57, change "that" to --the--.

Col. 4, line 29, change "supermark" to --supermarket--.

Col. 5, line 39, after "response" insert --to--.

Col. 6, line 12, change "gueues" to --queues--.

Col. 6, line 14, after "if" insert --at--.

Col. 6, line 33, change "of" to --for--.

Col. 7, line 3, change "If step" to --Step--.

Col. 7, line 13, change "alter" to --alert--.

Col. 7, line 63, change "the" to --that--.

Col. 8, line 13, change "is" to --in--.

Col. 8, line 61 (Claim 6, line 1), delete "claim".

Col. 8, line 62 (Claim 6, line 2), delete the comma.

UNITED STATES PATENT AND TRADEMARK OFFICE
CERTIFICATE OF CORRECTION

PATENT NO. : 4,654,656

DATED : March 31, 1987

INVENTOR(S) : Deaver et al

It is certified that error appears in the above—identified patent and that said Letters Patent is hereby corrected as shown below:

Col. 9, line 25 (Claim 10, line 8), change "offline" to -off-line-.

Col. 10, line 29 (Claim 13, line 2), after "and" insert -in-.

Signed and Sealed this

Twenty-fifth Day of August, 1987

*Attest:*

DONALD J. QUIGG

*Attesting Officer*      *Commissioner of Patents and Trademarks*